US011185176B2

(12) United States Patent
Farrar et al.

(10) Patent No.: US 11,185,176 B2
(45) Date of Patent: Nov. 30, 2021

(54) APPARATUS FOR HOLDING AN ARTWORK

(71) Applicant: CRATEIGHT LIMITED, London (GB)

(72) Inventors: Peter Antony Farrar, Leeds (GB); John Hein, Leeds (GB); Andrew Nikita Cunynghame Stramentov, London (GB); Anthony Henry Joseph Fraser, Rutland (GB)

(73) Assignee: CRATEIGHT LIMITED, London (GB)

(*) Notice: Subject to any disclaimer, the term of this patent is extended or adjusted under 35 U.S.C. 154(b) by 173 days.

(21) Appl. No.: 16/446,935

(22) Filed: Jun. 20, 2019

(65) Prior Publication Data
US 2019/0335926 A1 Nov. 7, 2019

Related U.S. Application Data

(63) Continuation of application No. PCT/GB2017/053435, filed on Nov. 15, 2017.

(30) Foreign Application Priority Data
Dec. 22, 2016 (GB) .................... 1622050

(51) Int. Cl.
A47G 1/16 (2006.01)
F16B 5/12 (2006.01)
F16B 21/02 (2006.01)

(52) U.S. Cl.
CPC ............ A47G 1/1626 (2013.01); F16B 5/121 (2013.01); F16B 5/123 (2013.01); F16B 21/02 (2013.01)

(58) Field of Classification Search
CPC ...... A47G 1/16; A47G 1/1686; A47G 1/1626; F16B 5/121; F16B 5/123; F16B 21/02;
(Continued)

(56) References Cited

U.S. PATENT DOCUMENTS 740,868 A 10/1903 Johnson
1,004,162 A * 9/1911 Le Guisquet ...... B65D 83/0005
217/64
(Continued)

FOREIGN PATENT DOCUMENTS

CH 559308 2/1975
CN 201057588 5/2008
(Continued)

OTHER PUBLICATIONS

GB Patent Application No. 1622046.9 filed Dec. 22, 2016 in the name of Crateight Limited.
(Continued)

Primary Examiner — Eret C McNichols
Assistant Examiner — Michael McDuffie
(74) Attorney, Agent, or Firm — Levine Bagade Han LLP

(57) ABSTRACT

Apparatus for use in holding an artwork during transportation and storage, the artwork comprising or being mounted within a frame with a plurality of fastening devices secured to the frame, each fastening device having an aperture in a part which protrudes from a side of the frame, the apparatus comprising a substantially flat mounting panel provided with a plurality of retention members; and a plurality of securing devices for securing the fastening devices to the mounting panel, each of the securing devices comprising an engagement part for engaging the fastening device and a locking part which is rotatable about an axis from a first angular position in which it can be located adjacent a respective retention member and a second angular position in which it engages with a respective retention member, whereby each securing device can be used to secure a respective fastening device to the mounting panel by aligning the aperture in the fastening device relative to a retention member of the mounting panel, inserting the locking part
(Continued)

through the aperture in the fastening device to a position adjacent a retention member so that the engagement part of the securing device engages a surface of the fastening device about the aperture therein, and rotating the locking part from the first angular position to the second angular position so the locking part engages with and is retained by said retention member.

17 Claims, 13 Drawing Sheets

(58) Field of Classification Search
CPC .... B65D 81/053; B65D 81/054; B65D 19/44; B65D 2519/0081; B65D 2519/00815
USPC .............. 248/444.1, 447.1, 450, 475.1, 476, 248/220.21, 220.22, 222.13, 222.52, 248/223.41, 224.8, 225.11; 206/586, 453; 108/55.1
See application file for complete search history.

(56) References Cited

U.S. PATENT DOCUMENTS

| | | | |
|---|---|---|---|
| 1,107,686 A | 8/1914 | Mehrmann | |
| 3,655,034 A | 4/1972 | Stollman et al. | |
| 3,769,730 A * | 11/1973 | Dole | G09F 1/12 40/732 |
| 3,922,807 A * | 12/1975 | Shore | A47G 1/0605 40/759 |
| 4,156,498 A | 5/1979 | Miller | |
| RE31,106 E * | 12/1982 | Pufpaff | F16B 21/02 403/146 |
| 4,474,492 A | 10/1984 | Fleitas | |
| 4,478,331 A * | 10/1984 | Ruin | B65D 25/107 206/454 |
| 4,557,457 A | 12/1985 | Cockfield et al. | |
| 4,572,470 A * | 2/1986 | Siffert | A47G 1/162 248/489 |
| 4,641,807 A | 2/1987 | Phillips | |
| 4,903,934 A * | 2/1990 | Fremstad | A47G 1/0655 248/222.52 |
| 5,259,523 A | 11/1993 | Scherb | |
| 5,314,159 A | 5/1994 | Szarata | |
| 5,518,118 A * | 5/1996 | Putz | B65D 25/10 206/449 |
| 6,651,948 B2 | 11/2003 | Szarata | |
| 6,808,074 B1 | 10/2004 | Schwartz | |
| 7,204,569 B2 * | 4/2007 | Walburn | A47B 96/16 108/42 |
| 7,422,112 B1 * | 9/2008 | Harte | B65D 81/057 206/583 |
| 7,644,820 B2 * | 1/2010 | Hohne | B65D 81/057 206/523 |
| 7,686,169 B1 * | 3/2010 | Harte | B65D 81/09 206/583 |
| 9,403,623 B2 * | 8/2016 | Aaland | B65D 25/10 |
| 10,836,554 B2 * | 11/2020 | Kronkright | F16F 15/06 |
| 2002/0009346 A1 | 1/2002 | Holt et al. | |
| 2007/0281580 A1 | 12/2007 | Sambenedetto | |
| 2009/0134290 A1 * | 5/2009 | Begic | F16M 13/02 248/222.13 |
| 2010/0116964 A1 | 5/2010 | Aleo | |
| 2012/0153108 A1 | 6/2012 | Schneider | |
| 2014/0001134 A1 | 1/2014 | Merey | |
| 2014/0346080 A1 * | 11/2014 | Knutz | B65D 81/053 206/523 |
| 2015/0034636 A1 | 2/2015 | Aaland et al. | |
| 2015/0223583 A1 | 8/2015 | Greenfield et al. | |
| 2015/0282345 A1 * | 10/2015 | Aspinall | H04M 1/04 248/220.22 |
| 2015/0300559 A1 | 10/2015 | Callif et al. | |
| 2019/0322445 A1 | 10/2019 | Farrar et al. | |

FOREIGN PATENT DOCUMENTS

| | | |
|---|---|---|
| CN | 102493984 | 6/2012 |
| CN | 203094632 | 7/2013 |
| CN | 205345757 | 6/2016 |
| CN | 205499854 | 8/2016 |
| DE | 4141573 | 6/1993 |
| DE | 202012002687 | 8/2013 |
| EP | 0518803 | 12/1992 |
| EP | 1074204 | 2/2001 |
| GB | 2116247 | 2/1986 |
| GB | 2535855 | 8/2016 |
| JP | 2001248613 | 9/2001 |
| WO | WO 1998/034853 | 8/1998 |
| WO | WO 2012/087163 | 6/2012 |

OTHER PUBLICATIONS

GB Patent Application No. 1622051.9 filed Dec. 22, 2016 in the name of Crateight Limited.
GB Patent Application No. 1704477.7 filed Mar. 21, 2017 in the name of Crateight Limited.

* cited by examiner

Fig. 8A
Fig. 8B
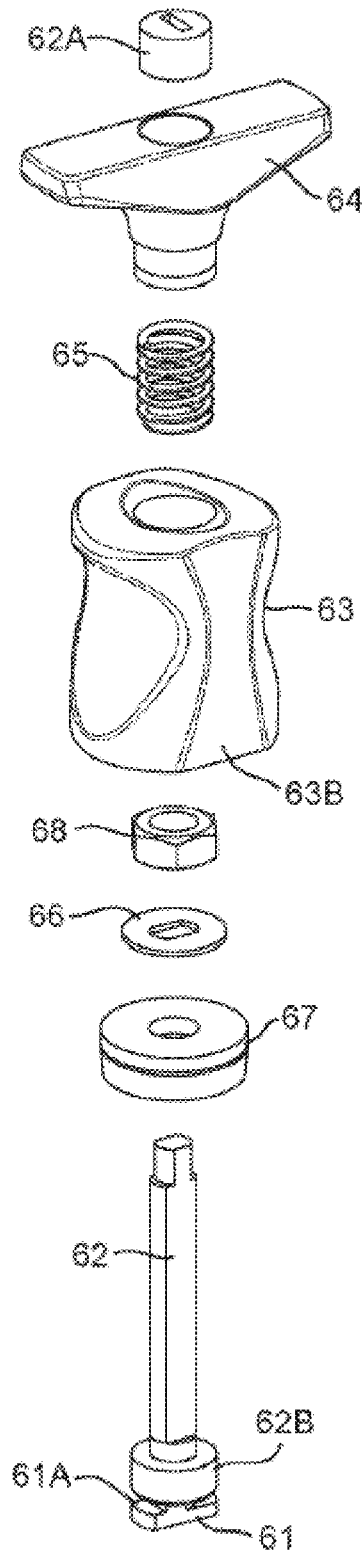
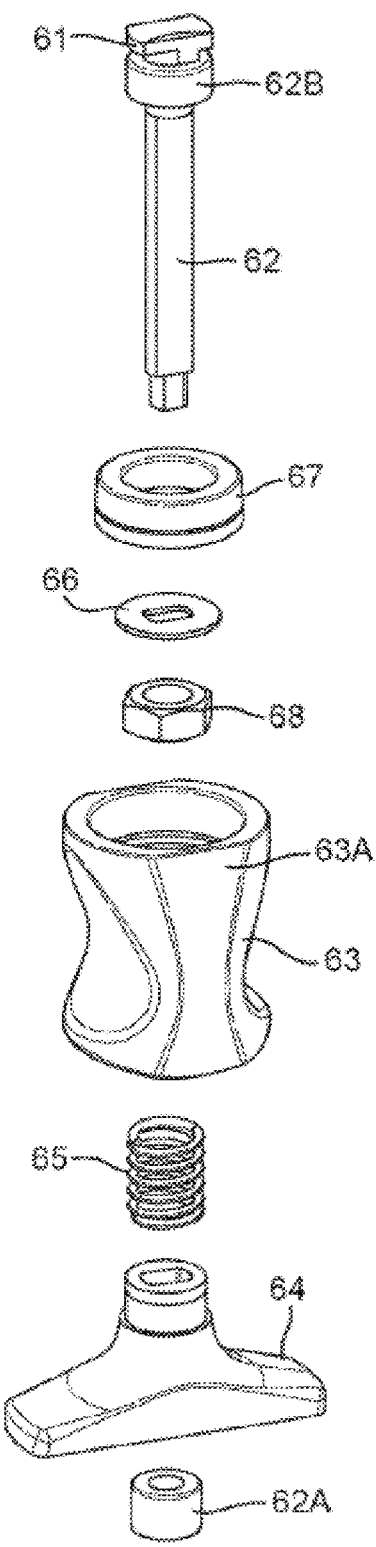

APPARATUS FOR HOLDING AN ARTWORK

CROSS-REFERENCE TO RELATED APPLICATIONS

This application is a continuation of International Patent Application No. PCT/GB2017/053435 filed Nov. 15, 2017, which claims priority to GB Patent Application Number 1622050.1 filed Dec. 22, 2016, the contents of which are incorporated herein by reference in their entirety.

BACKGROUND OF THE INVENTION

This invention relates to apparatus for use in holding an artwork during transportation and storage and in particular mounting an artwork to a mounting panel which may be housed within a container used for use in storing and transporting the artwork. The invention also relates to a fastening device adapted for use with said apparatus and to a subassembly comprising an artwork having a plurality of fastening devices secured thereto mounted on said apparatus.

It is known to secure a fastening device to the rear surface of the frame of an artwork. The fastening device is then used to secure the artwork to a mounting panel which in turn may be housed in a container.

There are a number of known ways of packaging artwork for transportation and storage. In some applications the artwork may be wrapped in soft material, e.g. bubble wrap, housed in a sleeve and the sleeve enclosed in a container which, in turn may be housed in an outer casing, often constructed from wood. In other applications, the corners of the frame are located in blocks of resilient material which are positioned on a backing plate of a container and affixed thereto, eg by hook and loop fasteners. Further blocks of resilient packaging material are then located over the corners of the artwork, so the artwork is sandwiched between the blocks and these further blocks are then held in place by a lid of the container.

Such known packaging is usually assembled and constructed by specialist art packaging and shipping firms and in many cases the container is effectively custom built for the particular application. Such packaging can thus be very expensive. Also, as the artwork may be of very high value, insurance companies have a significant influence over the manner in which the artwork is packed.

BRIEF SUMMARY OF THE INVENTION

An embodiment of the present invention aims to provide apparatus which enables an artwork to be packaged in an improved manner, eg so that the quality of the manner in which the artwork is packed is less dependent on the skill and expertise of the people assembling the packaging. In preferred forms of the apparatus, it enables a high quality packaging to be provided at lower cost and/or which can be easily adapted to accommodate artworks of different sizes and/or can be easily adjusted to hold an artwork of a different size and so can be re-used.

According to a first aspect of the invention, there is provided apparatus for use in holding an artwork during transportation and storage, the artwork comprising or being mounted within a frame with a plurality of fastening devices secured to the frame, each fastening device having an aperture in a part which protrudes from a side of the frame, the apparatus comprising:

a substantially flat mounting panel provided with a plurality of retention members; and
a plurality of securing devices for securing the fastening devices to the mounting panel;
each of the securing devices comprising an engagement part for engaging the fastening device and a locking part which is rotatable about an axis from a first angular position in which it can be located adjacent a respective retention member and a second angular position in which it engages with a respective retention member,
whereby each securing device can be used to secure a respective fastening device to the mounting panel by aligning the aperture in the fastening device relative to a retention member of the mounting panel, inserting the locking part through the aperture in the fastening device to a position adjacent a retention member so that the engagement part of the securing device engages a surface of the fastening device about the aperture therein, and rotating the locking part from the first angular position to the second angular position so the locking part engages with and is retained by said retention member.

The retention members may comprise a series of parallel slots or apertures in the mounting panel. The mounting panel may comprise a series of flanges coplanar with a face of the panel separated by a series of parallel slots and the retention member comprises a flange on each side of a slot.

The mounting panel preferably has a substantially uniform cross-section throughout its length so it can be formed by an extrusion process.

The securing devices each may comprise a handle at a proximal end whereby it can be rotated about said axis and the locking part at a distal end thereof and said locking part may comprise one or more arms extending substantially perpendicular to said axis in the form of a T-bar.

One or more arms of the T-bar is preferably arranged to pass through said slot when aligned substantially parallel thereto and to engage beneath the one or more flanges on each side of the slot when rotated about said axis to so as to lie at an angle to said slot.

When a fastening device is secured to the mounting panel by a securing device, engagement of the engagement part of the securing device with a fastening device preferably inhibits rotation of the engagement part about said axis relative to the fastening device.

The locking part of the securing device may be movable axially relative to said engagement part.

The engagement part preferably comprises a resiliently compressible member compression of which in a first axial direction provides said axial movement.

The apparatus is preferably arranged such that, when the locking part of the securing device is inserted through the aperture in the fastening device to a position adjacent a retention member and the engagement part of the securing device engages the surface of the fastening device about the aperture therein, a compression force is required to be applied to the securing device in said first axial direction to compress said compressible member and thus move the locking part further axially so that the locking part can rotated to engage said retention member.

The retention member is preferably shaped so that when the locking part is fully engaged therewith, the locking part is able to move to some extent in a second axial direction (opposite to the first axial direction) upon release of said compression force in the first axial direction.

The arrangement is preferably such that when a fastening device is secured to the mounting panel by a securing device, it is necessary to move the engagement part axially so it is no longer inhibited from being rotated by its engagement with the fastening device in order to permit rotation of the locking part to release it from the retention member.

Apparatus as described above in combination with a plurality of fastening devices for securing to the frame, each fastening device having an aperture in a protruding part which protrudes from a side of the frame.

The fastening device preferably comprises a first component and a second component, one for securing to the frame and the other for securing to the mounting panel, the second component being mounted to the first component so as to be movable relative to the first component so when the first component is secured to the frame the second component can be moved between a retracted position and an extended position relative to the frame.

According to a second aspect of the invention, there is provided a fastening device adapted for use with apparatus as claimed in any preceding claim, the fastening device having one or more apertures in a protruding part which, in use, protrudes from a side of the frame, whereby a securing device can be used to secure the fastening device to a mounting panel by aligning a first aperture in the fastening device relative to a retention member of the mounting panel, inserting the locking part through said first aperture in the fastening device to a position adjacent a retention member so that an engagement part of the securing device engages a surface of the fastening device about the aperture therein, and rotating the locking part from the first angular position to the second angular position so the locking part engages with and is retained by said retention member.

The second component may have holding means adapted to engage with an engagement part of the securing device so as to inhibit rotation of said engagement part relative to the second component when said engagement part is engaged with the holding means.

In use, said protruding part preferably extend in a first direction away from a side of a frame, and said first aperture is elongated in a direction at an angle to said first direction.

The fastening device is preferably adapted for mounting to a mounting panel having retention members in the form of a series of parallel slots or elongated apertures in the mounting panel arranged such that when said first direction of the fastening device is positioned substantially parallel to said slots or elongated apertures of the mounting panel said first aperture is elongated in a direction at an angle to said first direction so as to facilitate alignment of the first aperture with one of the slots or elongated apertures in the mounting panel.

The second aperture may be elongated in a direction substantially parallel to said first direction.

Said protruding part preferably comprises first and second apertures elongated in a direction substantially perpendicular to said first direction and third and fourth apertures elongated in a direction substantially parallel to said first direction and may also having screw holes therein.

Preferably, the fastening device comprises a first component and a second component, one for securing to the frame and the other for securing to a mounting panel, the second component being mounted to the first component so as to be movable between an extended position and a retracted position, said protruding part of the fastening device being part of or being said second component.

The arrangement of apertures in the fastening device may be symmetrical about a centre line perpendicular to said first direction.

The invention also provides apparatus as described above in combination with one or more fastening devices as described above.

According to a further aspect of the invention, there is provided a subassembly comprising an artwork having a plurality of fastening devices secured to a frame thereof, each fastening device having an aperture in a protruding part which protrudes from a side of the frame, and apparatus as described above, wherein each of the fastening devices is secured to a substantially flat mounting panel provided with a plurality of retention members by means of a securing device, each of the securing devices comprising an engagement part which engages a respective fastening device and a locking part which engages with a respective retention member of the mounting panel.

Other preferred and optional features of the invention will be apparent from the following description and from the subsidiary claims.

Reference is also made to applications GB 1622046.9 and GB 1704477.7 which describe and claim a particular form of fastening device with which the present invention can be used and to application GB 1622051.9 which describes and claims a particular form of container in which the apparatus can be mounted.

BRIEF DESCRIPTION OF THE SEVERAL VIEWS OF THE DRAWINGS

The invention will now be further described, merely by way of example, with reference to the accompanying drawings in which:

FIG. 3C a perspective view from one side and FIG. 4B being a side view, partially in cross-section;

FIGS. 8A and 8B are exploded perspective views of the securing device of the apparatus viewed from above and from beneath.

DETAILED DESCRIPTION OF THE INVENTION

Figure 1A:
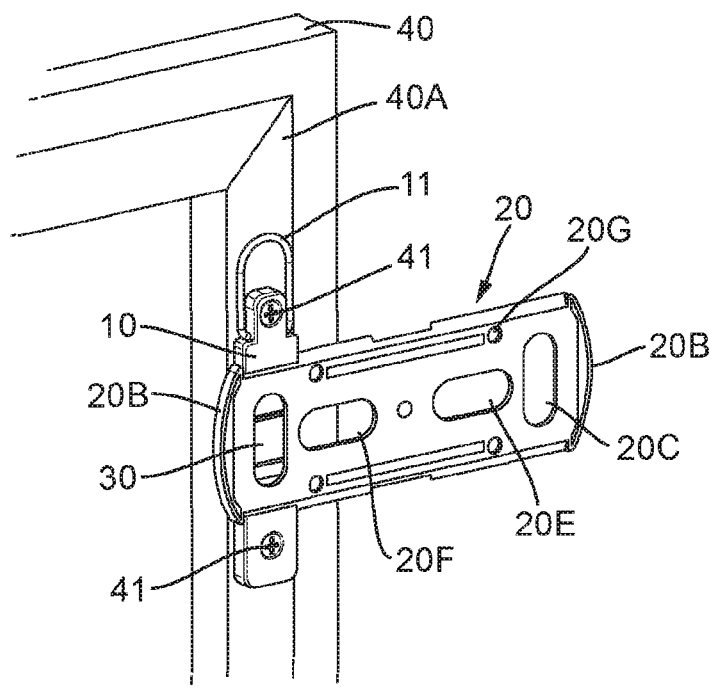
FIGS. 1A to 1D are perspective views of a fastening device used in connection with apparatus for holding an artwork according to the invention.
Figure 1B:
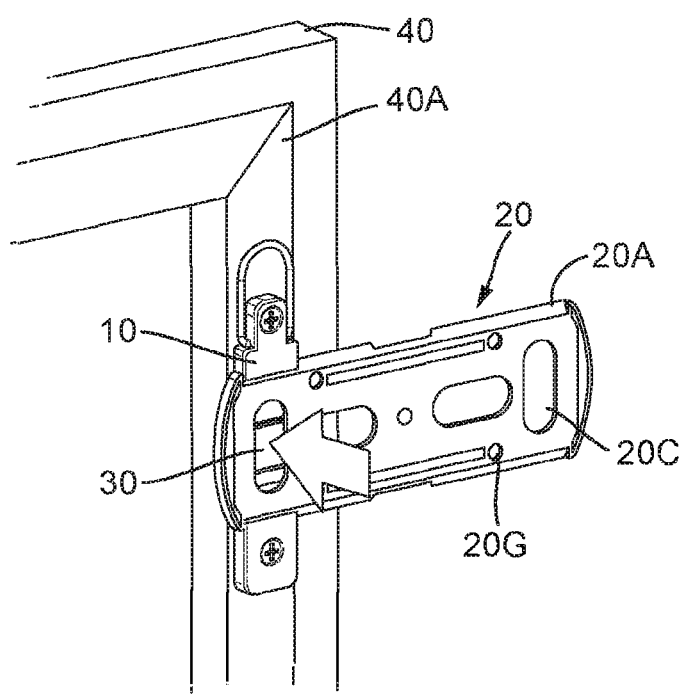
Figure 1C:
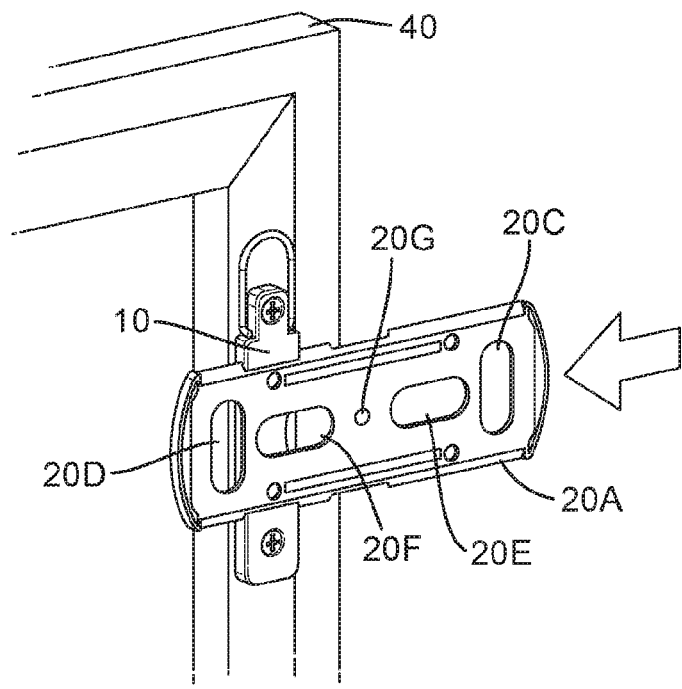

The apparatus described herein is designed to hold an artwork during transportation and storage, the artwork having a frame to which a plurality of fastening devices have been secured, each fastening device having an aperture in a part which protrudes from a side of the frame. FIGS. 1A to 1C show an artwork with a preferred form of fastening device secured thereto.

The fastening device shown in FIG. 1 comprises a first component 10 and a second component 20. The first component 10 is in the form of a metal plate which is secured to a rear surface of a picture frame of an artwork, eg by screws. The second component 20 is also in the form of a metal plate and is slidably mounted to the first plate. The fastening device also comprises a resilient member in the form of a spring clip 30 which, forms part of limiting means for inhibiting sliding movement of the second component 20 relative to the first component 10.

FIG. 1A shows the fastening device when secured to a rear surface 40A of the frame 40 of an artwork. The fastening device comprises a first component 10 and a second component 20. The first component 10 is preferably in the form of a metal plate which is securable to a rear surface 40A of a picture frame 40 of an artwork, eg by screws 41. The second component 20 is also preferably in the form of a metal plate and arranged to be slidably mounted to the first plate.

Figure 1D:
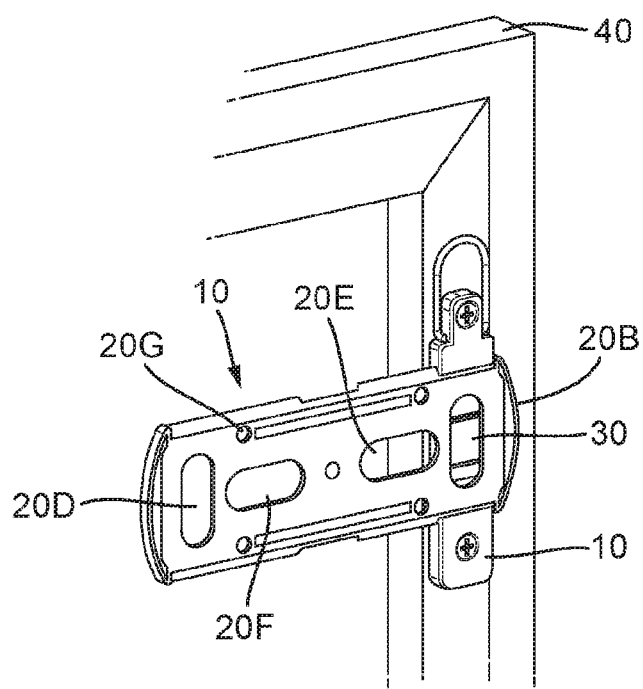
Figure 2:
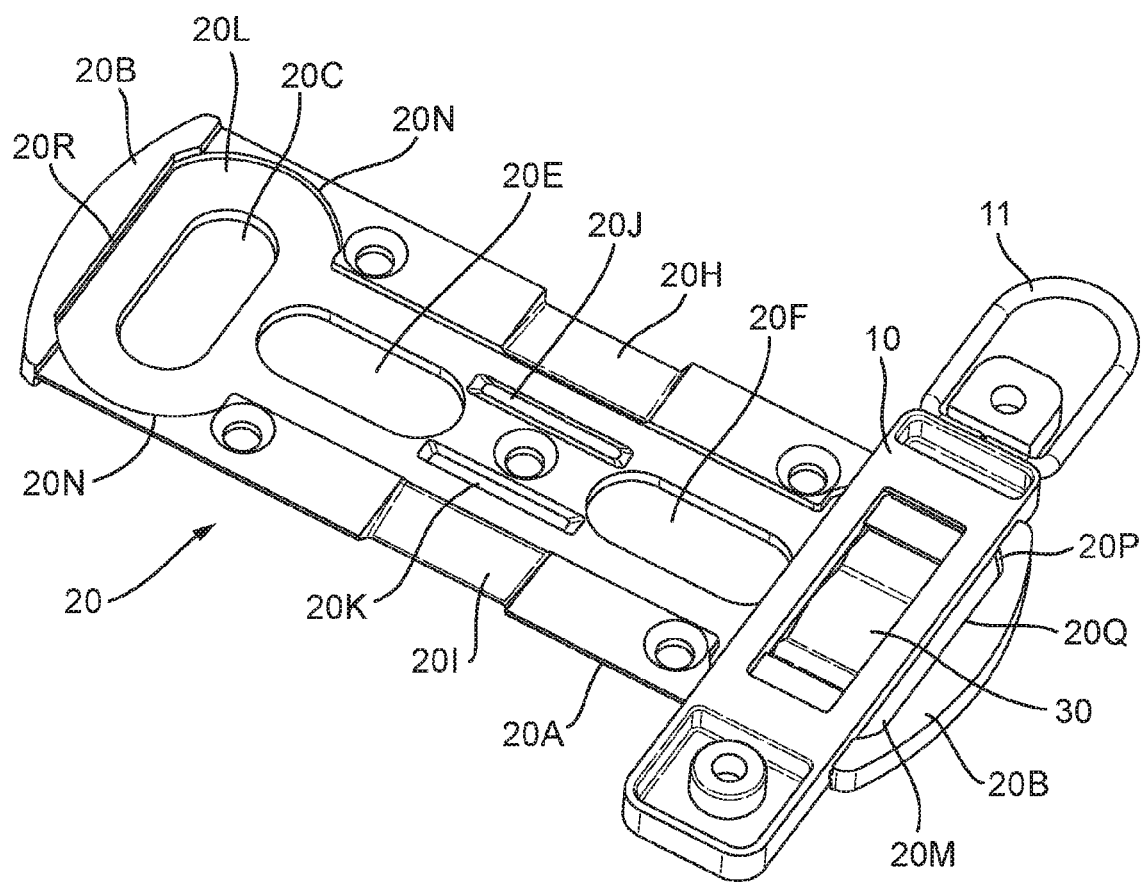
FIG. 2 is a perspective view of the underside of the fastening device shown in FIG. 1.

As shown in FIGS. 1 and 2, the second component 20 comprises first and second elongate apertures 20C, 20D, these apertures being elongated in a direction substantially perpendicular to the length of the second component 20, third and fourth elongate apertures which are elongated in a direction substantially parallel to the length of the second component 20, and a plurality of screw holes 20G The fastening device also comprises a spring clip 30 which releasably holds the second component 20 in an extended position (as shown in FIG. 1A) and a retracted position (as shown in FIG. 1D) relative to the frame 40 of the artwork and which may be used inhibit the second component 20 from sliding too far and becoming detached from the first component 10. Abutments 20B at the ends of the second component 20 may also be used to prevent the second component 20 from sliding out of the first component 10.

As mentioned, FIG. 1A shows the second component 20 in an extended, or protruding, position in which it projects beyond the edge of the frame 40. The second component 20 is releasably held in the extended position by engagement of the spring clip 30 with the second elongate aperture 20D of the second component.

To move the second component 20 from the extended position to the retracted position, the spring clip 30 is pressed, eg by a user's finger, through the second elongate aperture 20D to depress it and disengage it from the aperture (as illustrated by the arrow in FIG. 1B). The second component 20 can then be slid towards the retracted position (as illustrated by the arrow in FIG. 1C). FIG. 1D shows the second component 20 in the retracted position in which it no longer projects from the side of the frame 40 of the artwork. As described above, the second component 20 is releasably held in the retracted position by engagement of the spring clip 30 in the first elongate aperture 20C. It can be released from this position so it can be slid toward the extended position in the same manner as described in relation to FIG. 1B.

FIG. 2 shows the underside of the second component 20. This figure shows the first and second abutments 20B, the first and second elongate apertures 20C, 20D, and the third and fourth elongate apertures 20E, 20F mentioned above. FIG. 2 also shows first and second recesses 20H, 20I which interrupt angled edges 20A of the second component which enable the second component to be assembled with the first component (as described further in co-pending application GB 1622046.9). FIG. 2 also shows first and second grooves 20J, 20K for engaging with the spring clip 30 when the second component 20 is in a central position (midway between the extended and retracted positions) and third and fourth recesses 20L, 20M in the underside of the second component 20 in areas around the first and second elongate apertures 20C, 20D, these recesses 20L, 20M being bordered by partially circular side walls 20N, 20P and a side wall 20Q, 20R which form part of the abutments 20B.

The functions of the various apertures and recesses of the second component 20 will become apparent from the following description of how fastening devices are used to secure the artwork to a mounting panel 50 using a plurality of securing devices 60 and as shown in FIGS. 3 to 7.

Further details of the fastening device are described in application GB 1622046.9.

FIGS. 3 to 6 illustrate a preferred embodiment of the apparatus for holding an artwork. The apparatus comprises a plurality of securing devices 60, each securing device comprising an engagement part 63 for engaging the second component 20 of the fastening device and a locking part 61 which is rotatable about an axis by means of a handle 64 from a first angular position to a second angular position. The securing device 60 is further illustrated in FIGS. 7 and 8.

The securing device 60 is used to secure a respective fastening device to a mounting panel 50 by aligning the aperture 20C in the fastening device with a retention member of the mounting panel 50. The locking part 61 is inserted through the aperture 20C in the fastening device to a position adjacent the retention member so that the engagement part 63 of the securing device engages a surface of the fastening device about the aperture 20C therein. The locking part 61 is then rotated from the first angular position to the second angular position so the locking part 61 engages with and is retained by said retention member (as will be described further below).

The manner in which the securing device is used to hold the artwork on the mounting panel via a fastening device is further described with reference to FIGS. 3 to 7.

As shown in FIGS. 3 to 7, the mounting panel 50 preferably comprises a plurality of retention members with which the securing devices 60 interact to releasably secure the fastening devices (and hence the artwork) to the panel 50. In the preferred arrangement shown, the retention members comprise a series of parallel slots 51 defined by flanges 51A, 51B on each side of the slot 51 as shown in the Figures. The mounting panel 50 may for example comprise an aluminium panel 50 formed by an extrusion process to have a series of parallel slots 51 therein. It will be appreciated that the underside of the second component 20 (as described in relation to FIG. 2), is shown uppermost in FIGS. 3 to 7 as the artwork (and the fastening device attached thereto) has been turned over so the upper surface of the second component 20 engages the mounting panel 50.

As mentioned, the securing device 60 comprises a locking part, eg in the form of a T-bar 61, at a distal end of a shaft 62 for engaging in the slots 51 of the mounting panel 50, an engagement part 63 which, in use, engages the fastening device and a handle 64 at the proximal end of the shaft 62 for rotating the T-bar 61 through 90 degrees (as will be described further below). The engagement part 63 is able to move axially a small distance (typically a few mm) relative to the shaft 62 against the action of a spring 65 or other resilient member (see FIGS. 6 and 7) but is arranged to rotate with the shaft 62 as the handle 64 is rotated.

Figure 3A:
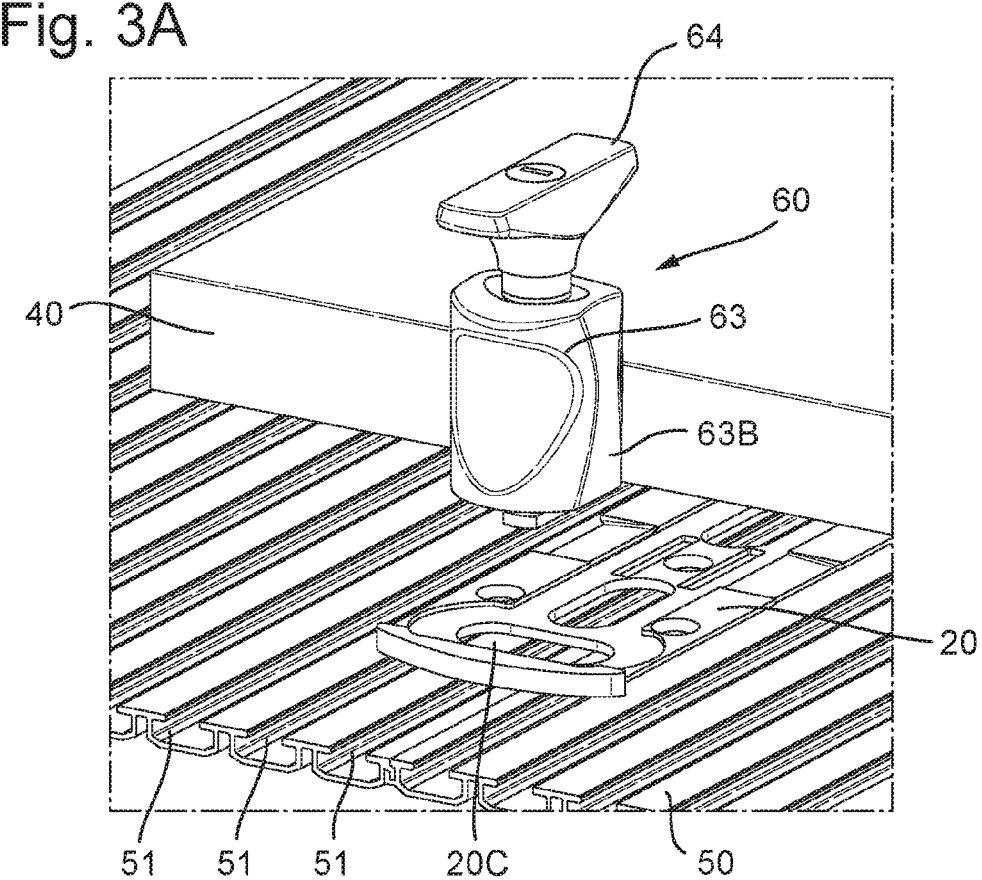
FIGS. 3A to 3D show a first embodiment of apparatus according to the invention ready for use in holding an artwork in conjunction with the fastening device shown in FIGS. 1 and 2, FIG. 3A being a perspective view, FIG. 3B being a front view.
Figure 3B:
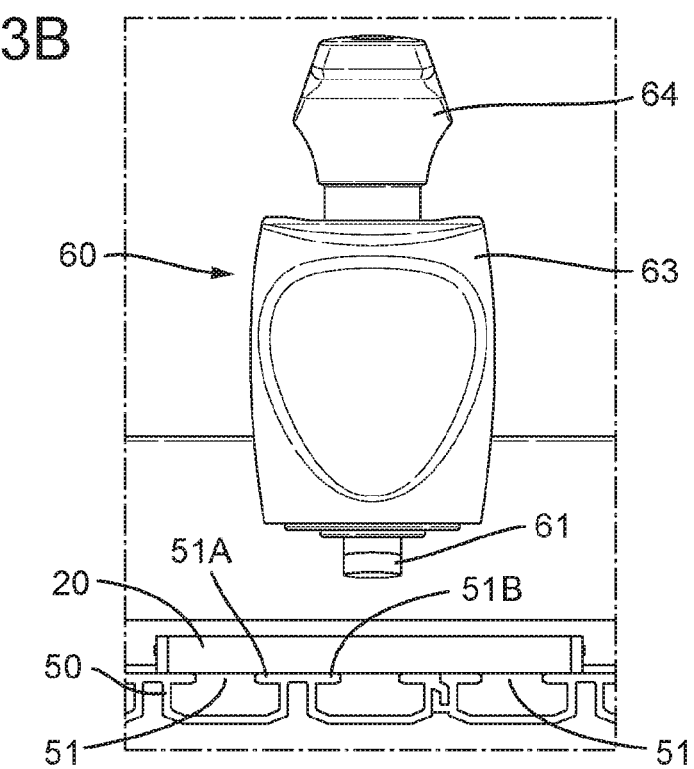
Figure 3C:
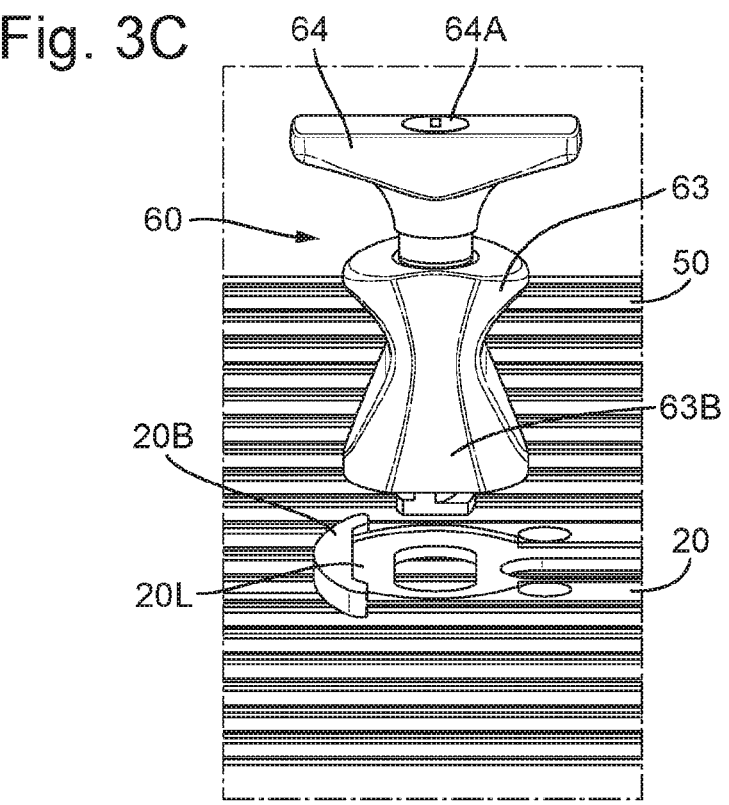
Figure 3D:
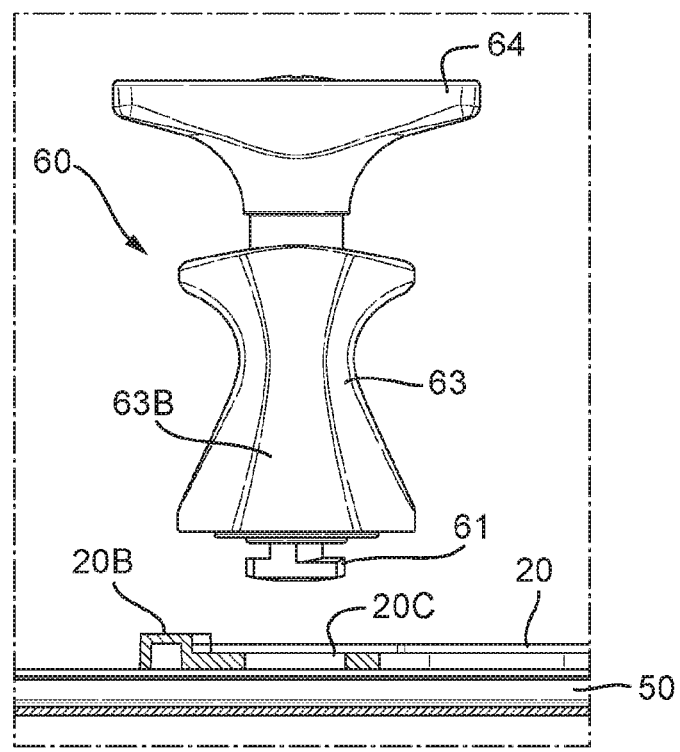

FIGS. 3A and 3D show the fastening device located on the mounting panel 50 so the second component 20 lies substantially parallel to the slots 51 and so that the second elongate aperture 20D thereof lies over one of the slots 51 and it shows the securing device 60, with the T-bar 61 and handle 64 substantially parallel to the slots 51 prior to being engaged with the fastening device.

Figure 4A:
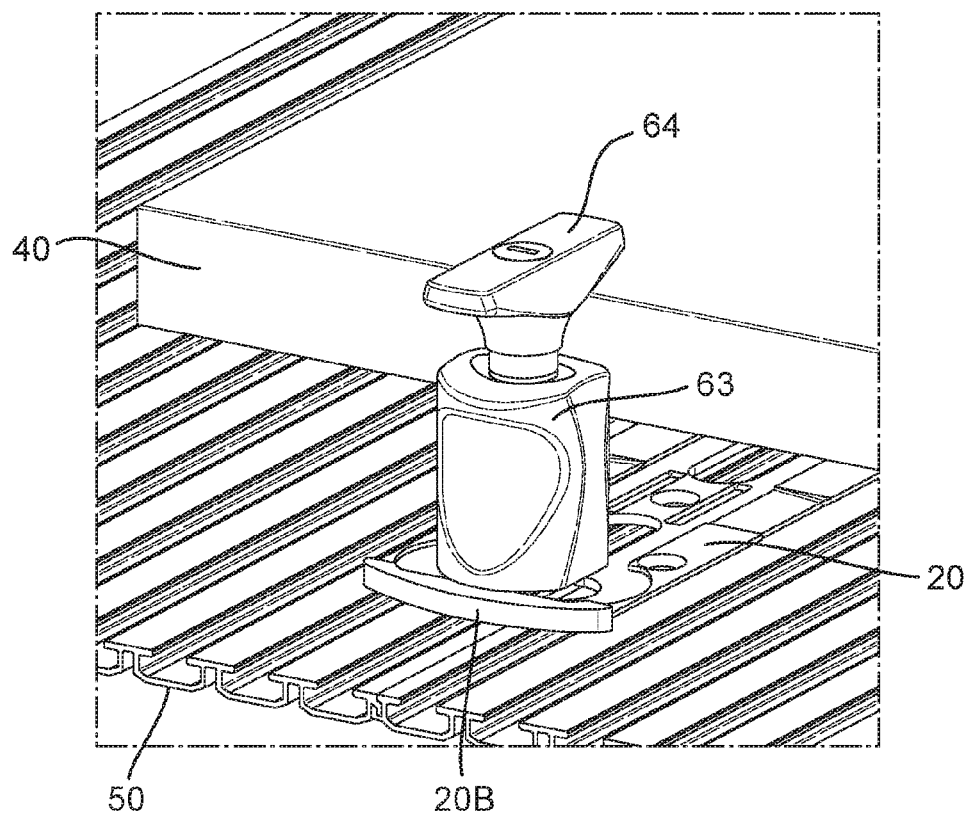
FIGS. 4A to 4D show views of the apparatus corresponding to those of FIGS. 3A to 3D once a securing device of the apparatus has been engaged with the fastening device.
Figure 4B:
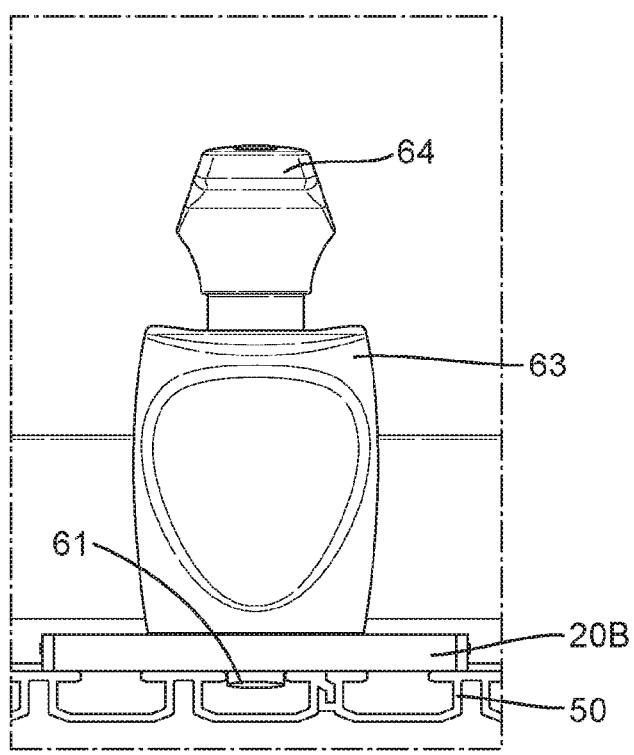
Figure 4C:
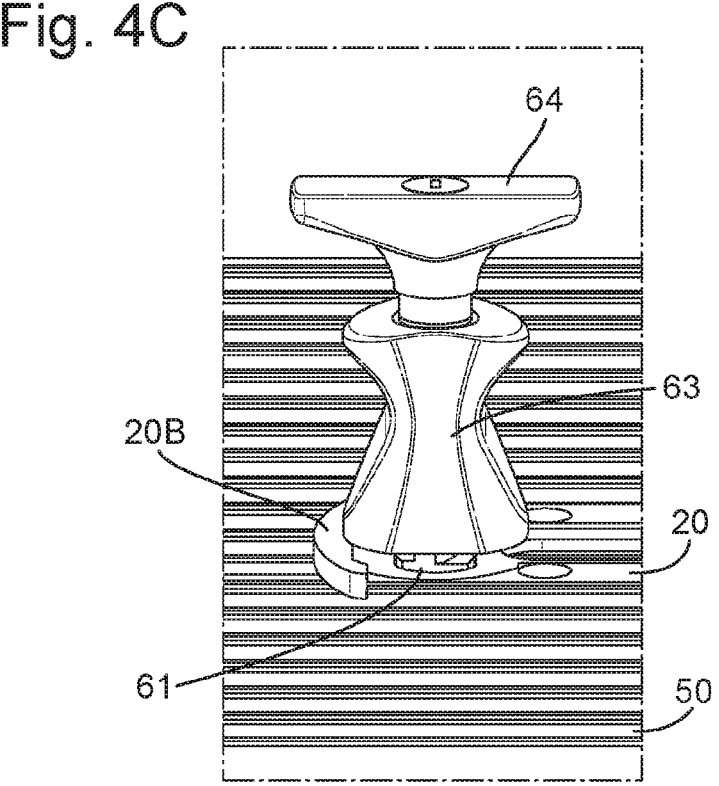
Figure 4D:
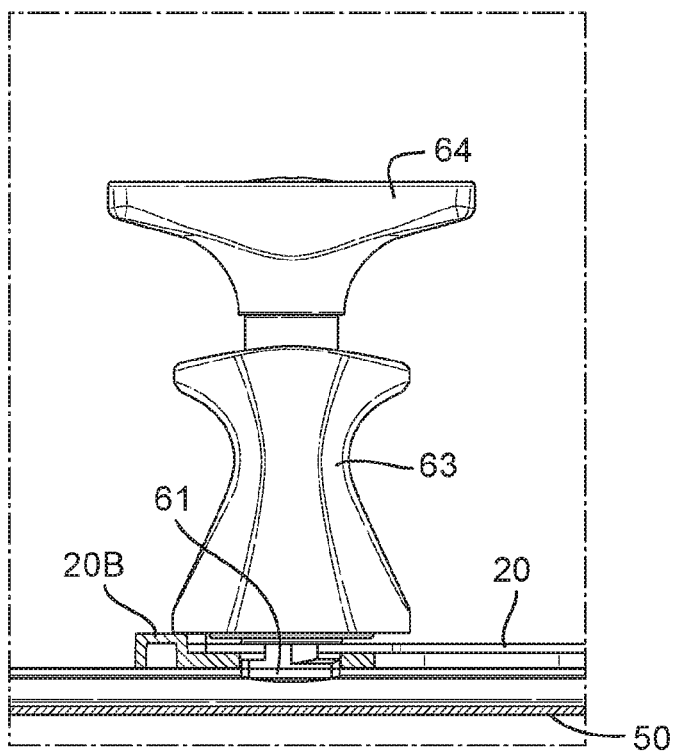
Figure 5A:
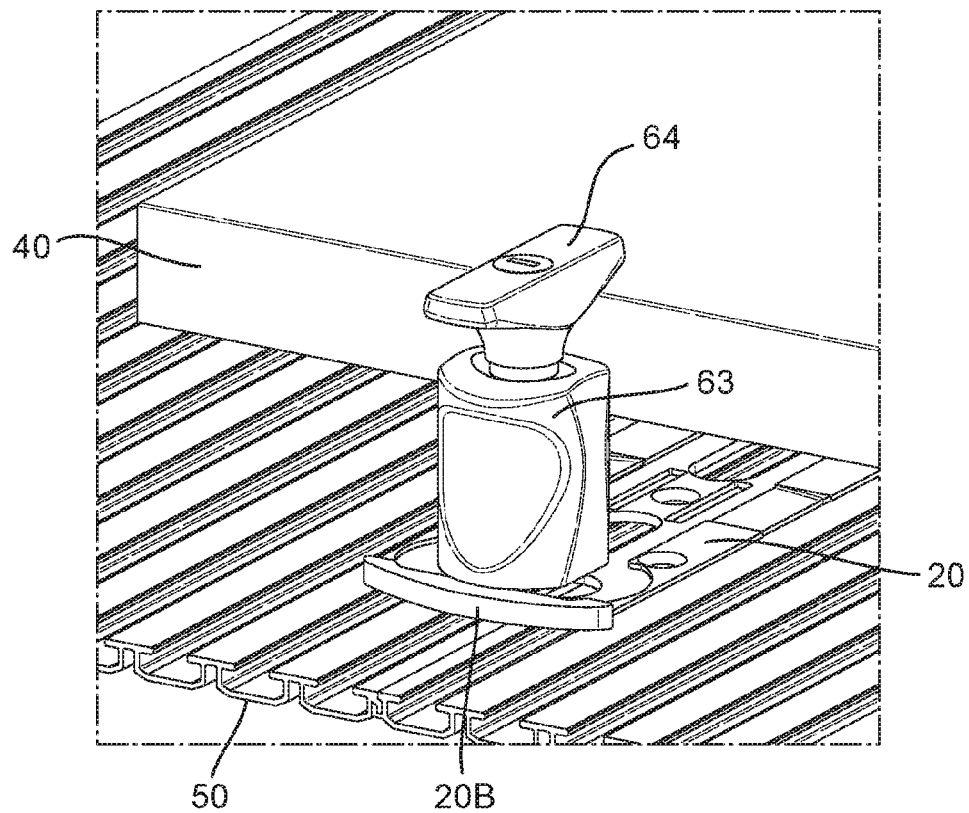
FIGS. 5A to 5D show views of the apparatus corresponding to those of FIGS. 4A to 4D once a handle of the securing device has been pressed downwards as illustrated by an arrow.
Figure 5B:
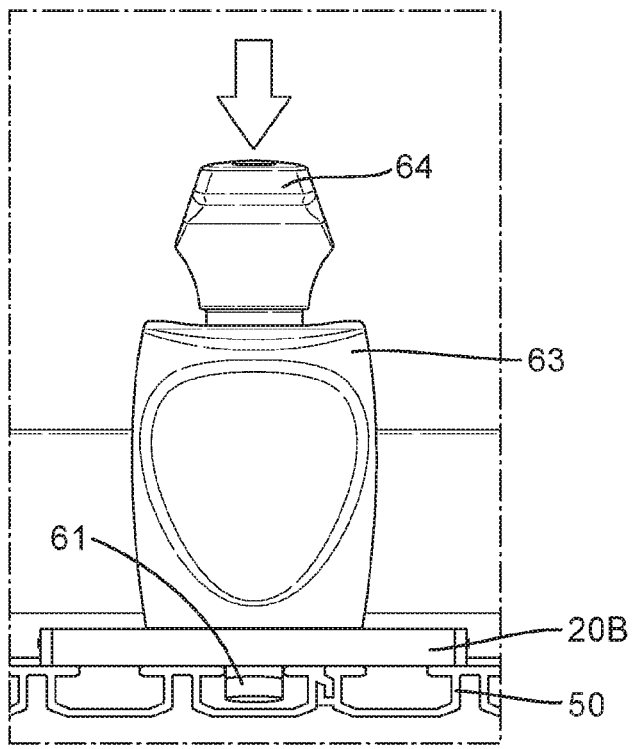
Figure 5C:
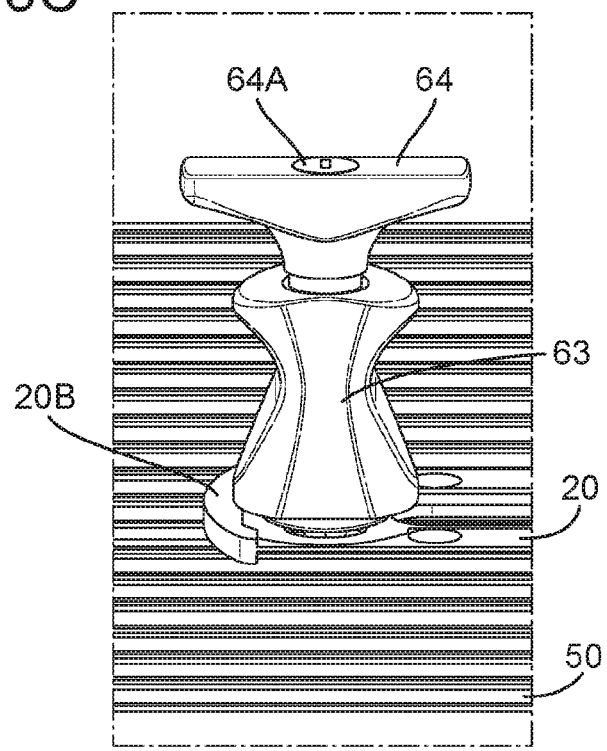
Figure 5D:
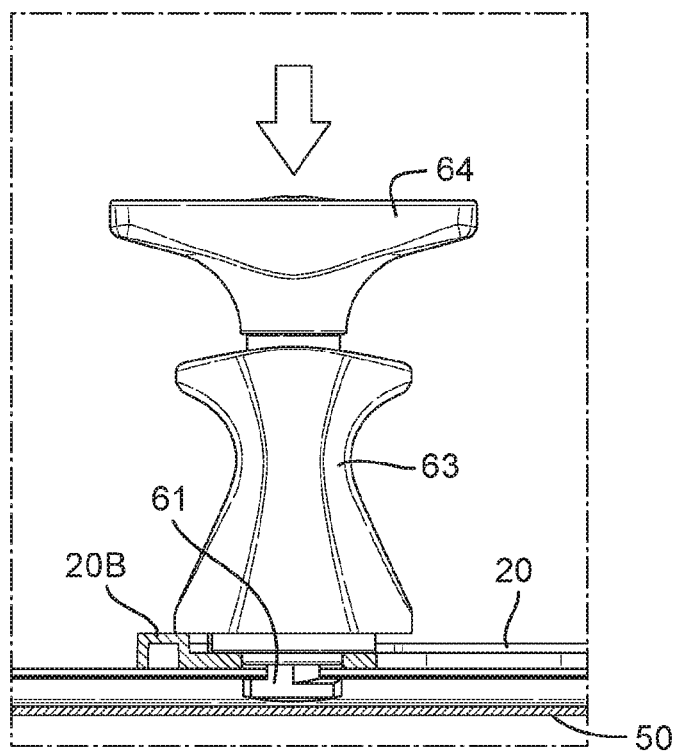
Figure 6A:
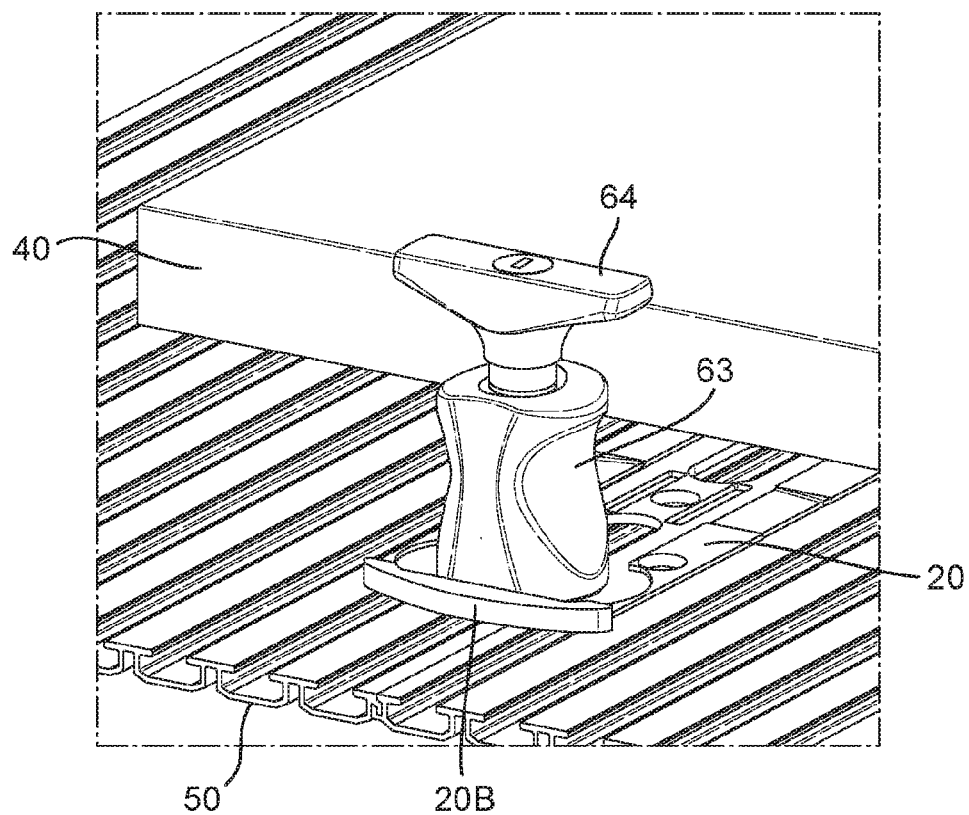
FIGS. 6A to 6D show views of the apparatus corresponding to those of FIGS. 5A to 5D once the handle of the securing device has been rotated as illustrated by an arrow.
Figure 6B:
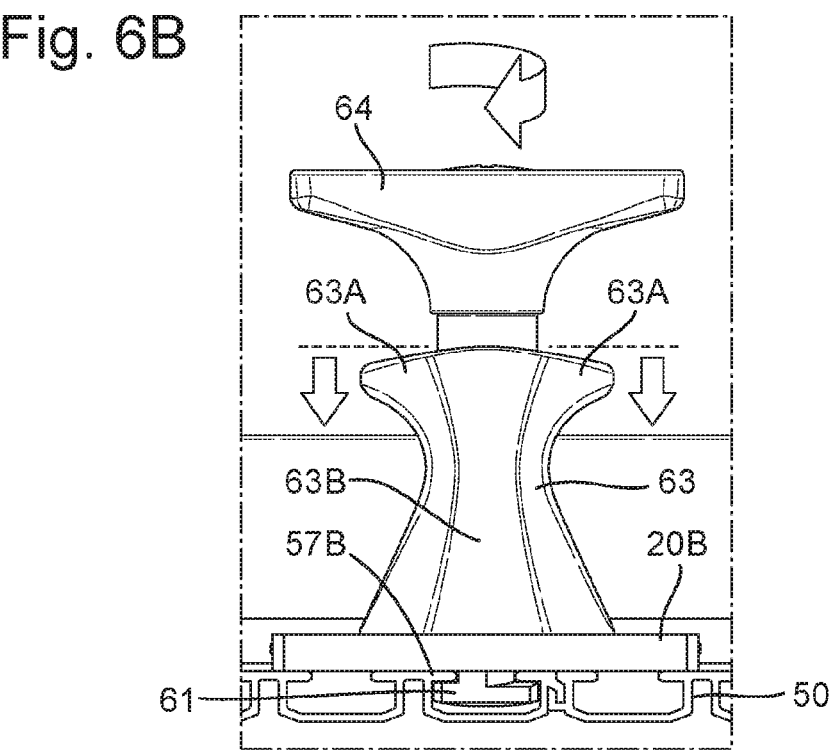
Figure 6C:
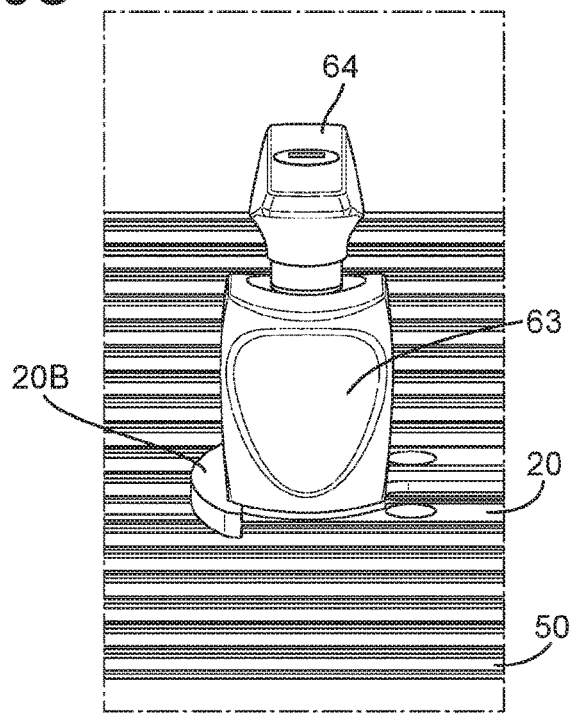
Figure 6D:
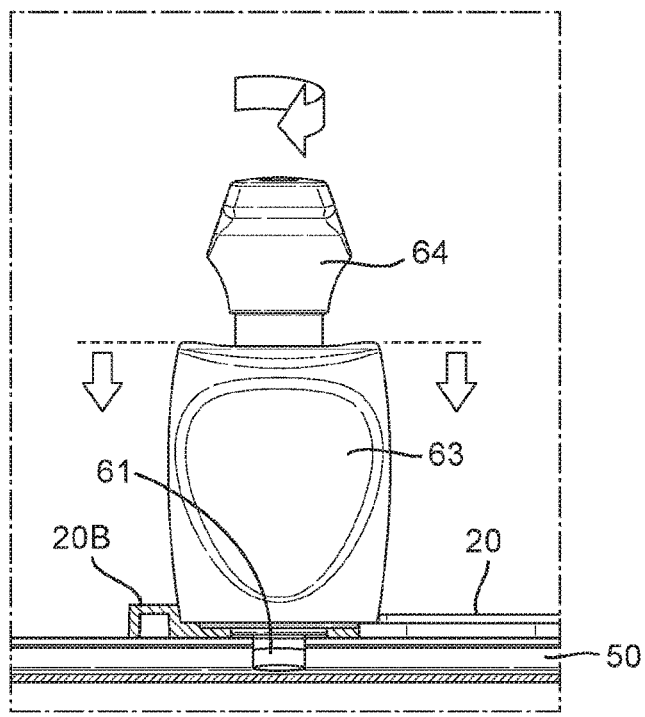

FIGS. 4A and 4B show the securing device 60 once it has been moved into engagement with the second component 20 of the fastening device. In the position shown, the engagement part 63 engages a surface of the abutment 20B and the T-bar 61 passes through (at least partially) the second aperture 20D and (at least partially) extends into a slot 51 in the mounting panel 50. It will be appreciated that to permit this, the second aperture 20D has to be large enough to receive the T-bar 61, at least when in the orientation shown, i.e. when substantially parallel to the length of the second component 20. Similarly, the slot 51 in the mounting panel 50 needs to be wide enough to receive the T-bar 61 in this orientation.

To secure the fastening device so that it secures the artwork to the mounting panel 50, the handle 64 is then pushed downwards, as illustrated by an arrow in FIG. 5, towards the fastening device so the T-bar 61 is moved further downwards into the slot 51 to a position in which an upper surface 61A of the T-bar (in the orientation shown) is at a slightly lower level than that defined by the undersides of the flanges 51A, 51B at the sides of the slot 51.

As illustrated by an arrow in FIG. 6, the handle 64 is then rotated through 90 degrees clockwise which in turn rotates the T-bar 51 through 90 degrees so that the arms of the T-bar are located beneath the flanges 51A, 51B at the side so of the slot 51. As mentioned above, the engagement part 63 rotates with the handle 64 so it also rotated through 90 degrees. This rotation of the engagement part 63 rotates it to a position in which it is able to move axially (under the action of the spring 65) so it moves downwards into the fourth recess 20M as shown in FIG. 6. It will be appreciated that this is due to the non-circular shape of the engagement part 63 which, as it rotates, no longer rests on a surface of the abutment 20B but is able to drop down into the fourth recess 20M.

In this position, the securing device 60 secures the fastening device (and hence the artwork) to the mounting panel 50.

In order to release the securing device 60 it needs to be turned 90 degrees anti-clockwise so that the T-bar 61 disengages from the undersides of the flanges 51A, 51B and can be withdrawn through the slot 51. However, a side face 63B the non-circular perimeter of the engagement part 63 engages the end wall 20R of the abutment and prevents the engagement part 63 from being rotated. Thus, before the securing device 60 can be released, the engagement part 63 has to be moved vertically to disengage it from the end wall 20R. The engagement part 63 is shaped to have two wings 63A at its upper end which can be engaged by a user's fingers as the user holds the handle 64 so the user can lift the engagement part 63 (against the action of the spring 65) so it disengages from the fourth recess 20M and can be rotated anti-clockwise through 90 degrees back to the position shown in FIG. 5 so that the T-bar 61 can be withdrawn from the slot 51 and the securing device 60 can be lifted away from the fastening device.

Figure 7A:
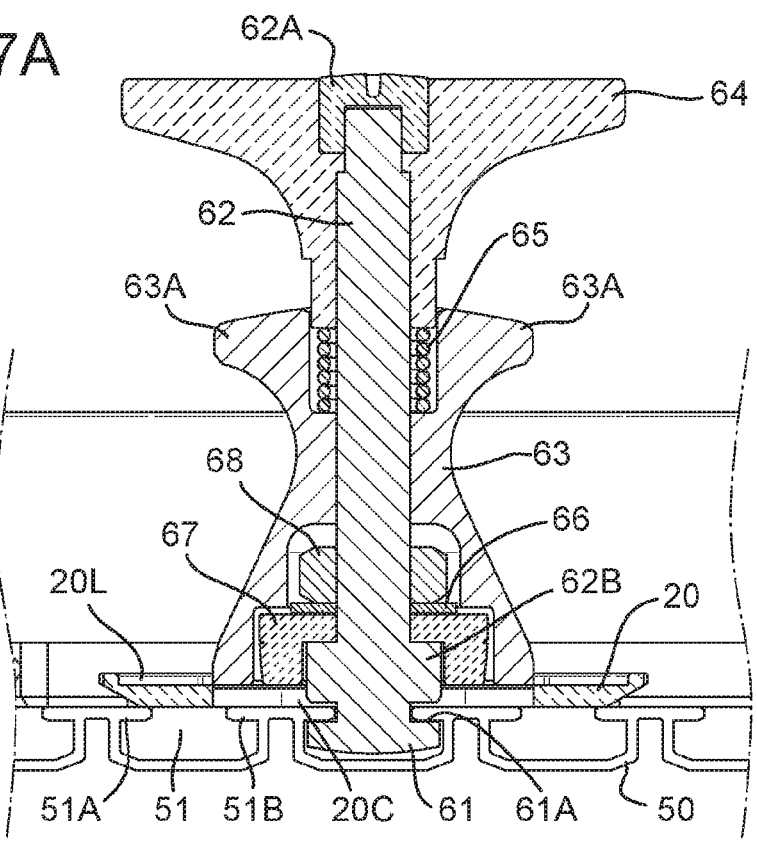
FIGS. 7A and 7B are cross-sectional views through the apparatus in the position shown in FIG. 6 taken on two perpendicular planes.
Figure 7B:
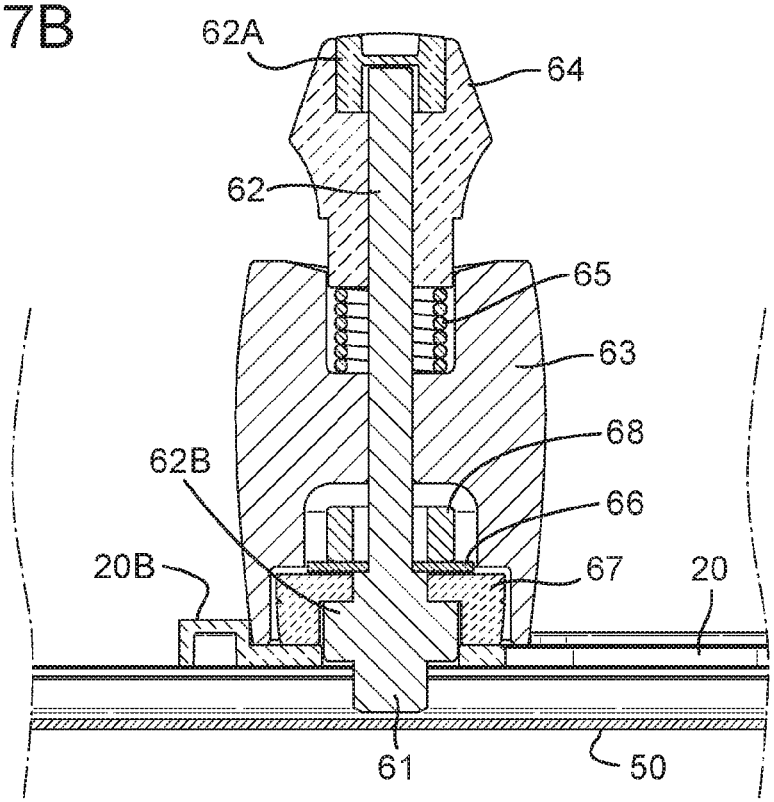

FIGS. 7A and 7B are cross-sectional views through the securing device, second component 20 and the mounting panel 50 when in the secured position shown in FIG. 6; FIG. 7A being taken on a plane perpendicular to the length of the slots 51 and FIG. 7B on a plane parallel to the length of the slots 51. FIG. 7 shows the handle 64, the engagement part 63 and its wings 63A, the spring 65, the shaft 62 and the locking part 61 described above. In addition, FIGS. 7A and 7B shows that the shaft has a widened portion 62B above but spaced from the locking part 61 at the distal end thereof, a washer 66 and a rubber collar 67 mounted on the shaft 62 and a nut 68. The rubber collar 67 is held in place against the widened portion 62B of the shaft by the nut 68 and washer. As shown in FIGS. 7A and 7B, the components of the securing device 60 are held together by the shaft 62 and nut 62A threaded onto the upper end of the shaft 62. The shaft 62 has a non-circular cross-section (see FIG. 8) and fits through correspondingly shaped through holes in the handle 64 and engagement part 63 so that when the handle 64 is rotated the shaft 62 and the engagement part 63 rotate with it. The engagement part 63 is however axially movable on the shaft 62 and is urged towards the downward position by the spring 65.

As shown in FIG. 7, the widened portion 62B of the shaft 62 is located within aperture 20C in the locked position and the underside of the rubber collar 67 engages the surface of the second component 20 about the aperture 20C.

FIG. 7A shows a cross-section through the mounting panel 50 and shows the slots 51 therein, and the flanges 51A and 51B at the sides of the slot 51

FIGS. 8A and 8B are exploded perspective views of the securing device 60, FIG. 8A being from above and FIG. 8B being from below the securing device, and shows the components described above in relation to FIG. 6.

As described in relation to FIGS. 1 and 2, the first and second apertures 20C, 20D are elongated in a direction at an angle to the direction of sliding of the second component 20, preferably in a direction perpendicular thereto. The elongated nature of these apertures 20C, 20D thus makes it easier to ensure that the aperture 20C lies over a slot 51 in the mounting panel 50. Two fastening devices will typically be secured to one side of the frame 40 of an artwork and the provision of elongate apertures 20C means that it is not necessary for these to be spaced apart by an exact multiple of the spacing of the slots 51 of the mounting panel 50 in order to ensure that the apertures 20D of both fastening devices lie over a slot in the mounting panel 50.

In a typical case, four fastening devices will be secured to the frame 40 of an artwork, two on each of two opposite sides of the frame 40 and the frame 40 will be mounted on the mounting panel 50 so that second components 20 of each of the fastening devices lie parallel to the length of the slots 51 in the mounting panel 50 (as shown in FIGS. 3 to 6). However, in some cases, it may be desired to secure one or more fastening devices to the other sides of the frame 40 so that the second components 20 of these devices lie perpendicular to the length of the slots 51 in the mounting panel 50. It is for his reason that the third and fourth elongated apertures 20E, 20F are provided in the second component 20. As these are elongated in a direction parallel to the length of the second component 20, they help ensure that the apertures 20E or 20F lie over a slot 51 in the mounting panel 50 so that the fastening device can be secured thereto by a securing device 60 in the manner described above in relation to FIGS. 3 to 6.

In the preferred arranged shown, the first and second apertures 20C, 20D are located toward the respective ends of the second component 20 and the third and fourth apertures 20E, 20F are located between these and the mid-point of the second component 20. However, the apertures may be arranged in other ways, eg in a reverse arrangement in which the third and fourth apertures (which are elongated in the direction of the length of the second component 20) lie toward the ends of the second component 20 and the first and second apertures (which are elongated in a direction at an angle to the length of the second component 20) lie between these and the midpoint of the second component 20.

In addition to the first and second apertures 20C, 20D and third and fourth apertures 20E, 20F, the second component 20 may also be provided with screw holes 20G so the second component 20 can be secured to a mounting panel 50 by way of screws or other screw thread fasteners. This is an optional method of fixing which may be used in addition to or in place of the securing devices 60 described above.

As shown in the drawings, the dimensions of the screw holes 20G are typically significantly smaller than the dimensions of the apertures 20C, 20D, 20E, 20F provided for receiving the locking part 61 of the securing device 60. Screw holes 20G will typically have a diameter of around 4-8 mm whereas the first and second apertures 20C, 20D (and the third and fourth apertures 20E, 20F) may typically have a width (in the shorter direction) in the range 10-20 mm, and preferably around 15 mm, and a length (in the longer dimension) in the range 25-45 mm, and preferably around 35 mm. Such dimensions enable the first and second apertures to be aligned with slots which typically have a pitch in the range 15-25 mm (and preferably around 20 mm) without the need for precise location of the fastening devices on the artwork as described above.

As mentioned above, the second component 20 is preferably symmetrical about is centre line so that it does not matter which way round it is assembled with the first component 10. However, other arrangements can be envisaged, in particular arrangements in which the layout of holes, apertures and/or recesses therein is not symmetrical.

As described above, in the preferred arranged, the retention members on the mounting panel 50 are provided by slots therein (and flanges defining the sides of the slot). In such an arrangement, the mounting panel may comprise a series of flanges coplanar with a face of the panel 50 separated by a series of parallel slots. However, other forms of retention members can be envisaged.

The slots may, for example, not be continuous but may be interrupted, eg to form a lines of shorter slots. An array of other shaped slots or apertures may also be provided across the mounting panel. In a further arrangement, the retention members may comprise members fastened to the surface of the mounting panel each of which is shaped to engage with the T-bar 61 (or other form of locking part) of the securing device 60. It should also be appreciated that the retention members may not be provided across all areas of the mounting panel. In an arrangement, one or more retention members may be attached to a mounting panel only at locations in which the securing device will be located for a particular artwork.

The T-bar preferably comprises two projecting arms but other forms of locking part arranged to engage and disengage from a respective retaining part can be envisaged.

Other arrangements for enabling the engagement part of the securing device to move axially relative to the locking part can be envisaged. The engagement part may comprise a resiliently compressible member (such as a spring or a rubber component) compression of which in the axial direction provides said axial movement. In a preferred arrangement (such as that described in relation to FIGS. 3 to 8), a compressing force is required to be applied to the securing device in the axial direction to compress said compressible member in order to move the locking part axially so that it is able to engage with a retention member.

In such arrangements, it is necessary to move the engagement means axially so it is no longer inhibited from being rotated by its engagement with the fastening device in order to permit rotation of the locking part to release it from the retention member.

The retention member may also be shaped so that when the locking part is fully engaged therewith, the locking part is able to move to some extent in a second axial direction (opposite to the first axial direction) upon release of said compressing force in the first axial direction. The retention member thus inhibits rotation of the locking part in a counter-clockwise direction until the locking part is pressed downwards slightly. This provides an alternative, or additional, means for preventing inadvertent release of the locking part from the retention member.

Parts of the securing device 60, such as the handle 64 and engagement part 63, are preferably formed of a plastics material, for example polyoxymethylene POM (which is tough and has low friction properties). Other parts of the securing device, eg the bolt 64A and the locking part 61, are preferably made of metal, eg steel.

The apparatus described above, comprising a plurality of securing devices 60 and a mounting panel 50 may be supplied alone or may be supplied in combination with a plurality of fastening devices such as those described in relation to FIGS. 1 and 2. Other forms of fastening devices may be used which can be secured to the frame of an artwork and which have an aperture in a part which protrudes from a side of the frame through which the locking part of the securing device can be inserted.

Preferably, the fastening device comprises a first component and a second component, one for securing to the frame and the other for securing to the mounting panel, the second component being mounted to the first component so as to be movable relative to the first component so, when the first component is secured to the frame, the second component can be moved between a retracted position and an extended or protruding position relative to the frame.

As described, the securing device and the fastening device are each be adapted so they can be used with each other and, in particular, the fastening device should have one or more apertures which are shaped and sized to receive the locking part of the securing device and so enable the securing device to be used to secure the fastening device (and hence an artwork) to a mounting panel in the manner described.

To enable this, a fastening device adapted for use with apparatus described above has one or more apertures in a part which, in use, protrudes from a side of the frame, whereby a securing device can be used to secure the fastening device to a mounting panel by aligning a first aperture in the fastening device relative to a retention member of the mounting panel, inserting the locking part through said first aperture in the fastening device to a position adjacent a retention member so that an engagement part of the securing device engages a surface of the fastening device about the aperture therein, and rotating the locking part from the first angular position to the second angular position so the locking device engages with and is retained by said retention member.

Preferably, said protruding part, in use, extends in a first direction away from a side of a frame, and said first aperture is elongated in a direction at an angle (eg perpendicular) to said first direction.

When the fastening device is to be used with a mounting panel having retention members in the form of a series of parallel slots (or elongated apertures), the fastening device is preferably arranged such that when said first direction, ie its length direction, is positioned parallel to said slots (or elongated apertures), said first aperture is elongated in a direction at an angle to the first direction so as to facilitate alignment of the first aperture with one of the slots (or elongated apertures) in the mounting panel.

As described above, the fastening device preferably also has a second aperture which is elongated in a direction substantially parallel to said first direction to provide a similar function when the fastening device is positioned so said first direction lies perpendicular to the length of the slots (or elongated apertures).

A preferred form of fastening device comprises first and second apertures elongated in a direction substantially perpendicular to said first direction and third and fourth apertures elongated in a direction substantially parallel to said first direction, eg as illustrated in FIG. 2.

The fastening device may also having screw holes therein so it can be fastened to a mounting panel by screws (in addition to or instead of using the securing devices described herein).

As described above, the fastening device preferably comprises a first component and a second component, one for securing to the frame and the other for securing to a mounting panel, the second component being mounted to the first component so as to be movable between an extended position and a retracted position, said protruding part of the fastening device being part of or being said second component.

In a particularly convenient arrangement, the fastening device has an arrangement of apertures therein is symmetrical about a centre line perpendicular to said first direction so that it does not matter which way round it is assembled with the first component.

It will be appreciated that using apparatus as described above to hold an artwork, a sub-assembly is formed comprising an artwork having a plurality of fastening devices secured to a frame thereof, each fastening device having an aperture in a protruding part which protrudes from a side of the frame, wherein each of the fastening devices is secured to a substantially flat mounting panel provided with a plurality of retention members by means of a securing device, each of the securing devices comprising an engagement part which engages a respective fastening device and a locking part which engages with a respective retention member of the mounting panel.

Such a sub-assembly can be housed in a container, the mounting panel (with the artwork mounted thereon) being secured or held within the container. A preferred form of container for housing such a sub-assembly is described in application GB 1622051.9.

For the avoidance of doubt, the verb "comprise" as used herein has its normal dictionary meaning, ie to denote non-exclusive inclusion. The use of the word "comprise" (or any of its derivatives) does not therefore exclude the possibility of further features being included.

All of the features disclosed in this specification (including the accompanying claims, and drawings) may also be combined in any combination (other than combinations where the features are mutually exclusive).

Each feature disclosed in this specification (including the accompanying claims and drawings) may be replaced by alternative features serving the same, equivalent or similar purpose, unless expressly stated otherwise. Thus, unless expressly stated otherwise, each feature disclosed is just an example of a generic series of features providing an equivalent or similar function.

The invention is not restricted to the details of the embodiments described. The invention extends to a container and/or closure which comprises one or more of the features referred to above, or any other novel concept, feature, or combination of the features disclosed herein.

We claim:

1. Apparatus for use in holding an artwork during transportation and storage, the artwork comprising or being mounted within a frame with a plurality of fastening devices secured to the frame, each fastening device having an aperture in a part which protrudes from a side of the frame, the apparatus comprising:
   a substantially flat mounting panel provided with a plurality of retention members; and
   a plurality of securing devices for securing the fastening devices to the mounting panel;
   each of the securing devices comprising an engagement part for engaging the fastening device and a locking part which is rotatable about an axis from a first angular position in which it can be located adjacent a respective retention member and a second angular position in which it engages with a respective retention member,
   whereby each securing device can be used to secure a respective fastening device to the mounting panel by aligning the aperture in the fastening device relative to a retention member of the mounting panel, inserting the locking part through the aperture in the fastening device to a position adjacent a retention member so that the engagement part of the securing device engages a surface of the fastening device about the aperture therein, and rotating the locking part from the first angular position to the second angular position so the locking part engages with and is retained by said retention member, and
   whereby the securing devices each comprise a handle at a proximal end whereby it can be rotated about said axis and the locking part at a distal end thereof.

2. Apparatus as claimed in claim 1 in which the retention members comprise a series of parallel slots or apertures in the mounting panel.

3. Apparatus as claimed in claim 2 in which the mounting panel comprises a series of flanges coplanar with a face of the panel separated by a series of parallel slots.

4. Apparatus as claimed in claim 3 in which the retention member comprises a flange on each side of a slot.

5. Apparatus as claimed in claim 2 in which the mounting panel has a substantially uniform cross-section throughout its length so it can be formed by an extrusion process.

6. Apparatus as claimed in claim 1 in which said locking part comprises one or more arms extending substantially perpendicular to said axis.

7. Apparatus as claimed in claim 1 in which when a fastening device is secured to the mounting panel by a securing device, engagement of the engagement part of the securing device with a fastening device inhibits rotation of the engagement part about said axis relative to the fastening device.

8. Apparatus as claimed in claim 1 in which the locking part of the securing device is movable axially relative to said engagement part.

9. Apparatus as claimed in claim 8 in which the engagement part comprises a resiliently compressible member compression of which in a first axial direction provides said axial movement.

10. Apparatus as claimed in claim 9 arranged such that, when the locking part of the securing device is inserted through the aperture in the fastening device to a position adjacent a retention member and the engagement part of the securing device engages the surface of the fastening device about the aperture therein, a compression force is required to be applied to the securing device in said first axial direction to compress said compressible member and thus move the locking part further axially so that the locking part can be rotated to engage said retention member.

11. Apparatus as claimed in claim 10 in which the retention member is shaped so that when the locking part is fully engaged therewith, the locking part is able to move to some extent in a second axial direction (opposite to the first axial direction) upon release of said compression force in the first axial direction.

12. A fastening device adapted for use with an apparatus for holding an artwork during transportation and storage, wherein the artwork comprising or being mounted within a frame with the fastening device secured to the frame, wherein the fastening device having one or more apertures in a protruding part which, in use, protrudes from a side of the frame,
wherein the apparatus further comprises:
a substantially flat mounting panel provided with a plurality of retention members; and
a plurality of securing devices for securing the fastening devices to the mounting panel,
wherein each of the securing devices comprising an engagement part for engaging the fastening device and a locking part which is rotatable about an axis from a first angular position in which it can be located adjacent a respective retention member and a second angular position in which it engages with a respective retention member,
wherein each of the securing devices can be used to secure a respective fastening device to the mounting panel by aligning the aperture in the fastening device relative to a retention member of the mounting panel, inserting the locking part through the aperture in the fastening device to a position adjacent a retention member so that the engagement part of the securing device engages a surface of the fastening device about the aperture therein, and rotating the locking part from the first angular position to the second angular position so the locking part engages with and is retained by said retention member,
whereby a securing device can be used to secure the fastening device to a mounting panel by aligning a first aperture in the fastening device relative to a retention member of the mounting panel, inserting the locking part through said first aperture in the fastening device to a position adjacent a retention member so that an engagement part of the securing device engages a surface of the fastening device about the aperture therein, and rotating the locking part from the first angular position to the second angular position so the locking part engages with and is retained by said retention member, and
further comprising a second component having a holding means for engaging with an engagement part of the securing device for inhibiting rotation of said engagement part relative to the second component when said engagement part is engaged with the holding means.

13. A fastening device as claimed in claim 12 for mounting to a mounting panel having retention members in the form of a series of parallel slots or elongated apertures in the mounting panel arranged such that when a first direction of the fastening device is positioned substantially parallel to said slots or elongated apertures of the mounting panel said first aperture is elongated in a direction at an angle to said first direction so as to facilitate alignment of the first aperture with one of the slots or elongated apertures in the mounting panel.

14. A fastening device as claimed in claim 12 having a second aperture which is elongated in a direction substantially parallel to said first direction.

15. A fastening device as claimed in claim 14 in which said protruding part comprises first and second apertures elongated in a direction substantially perpendicular to said first direction and third and fourth apertures elongated in a direction substantially parallel to said first direction.

16. A fastening device as claimed in claim 12 comprising a first component and a second component, one for securing to the frame and the other for securing to a mounting panel, the second component being mounted to the first component so as to be movable between an extended position and a retracted position, said protruding part of the fastening device being part of or being said second component.

17. A subassembly comprising:
an artwork frame having a plurality of fastening devices secured thereto, each fastening device having an aperture in a protruding part which protrudes from a side of the artwork frame; and
an apparatus as claimed in claim 1, wherein each of the fastening devices of the artwork frame is secured to the substantially flat mounting panel of the apparatus provided with the plurality of retention members by the plurality of securing devices.

* * * * *